US010913399B2

(12) United States Patent
Andersson et al.

(10) Patent No.: US 10,913,399 B2
(45) Date of Patent: Feb. 9, 2021

(54) LOAD CARRIER FOOT

(71) Applicant: THULE SWEDEN AB, Hillerstorp (SE)

(72) Inventors: Stefan Andersson, Värnamo (SE); Fredrik Larsson, Vaggeryd (SE)

(73) Assignee: THULE SWEDEN AB, Hillerstorp (SE)

( * ) Notice: Subject to any disclaimer, the term of this patent is extended or adjusted under 35 U.S.C. 154(b) by 0 days.

(21) Appl. No.: 16/762,866

(22) PCT Filed: Dec. 18, 2018

(86) PCT No.: PCT/EP2018/085458
§ 371 (c)(1),
(2) Date: May 8, 2020

(87) PCT Pub. No.: WO2019/121658
PCT Pub. Date: Jun. 27, 2019

(65) Prior Publication Data
US 2020/0282918 A1    Sep. 10, 2020

(30) Foreign Application Priority Data
Dec. 19, 2017   (EP) .................................... 17208324

(51) Int. Cl.
*B60R 9/058*    (2006.01)
*B60R 11/00*    (2006.01)

(52) U.S. Cl.
CPC ....... *B60R 9/058* (2013.01); *B60R 2011/0059* (2013.01); *B60R 2011/0084* (2013.01)

(58) Field of Classification Search
CPC . B60R 9/052; B60R 9/058; B60R 2011/0059; B60R 2011/0084

(Continued)

(56) References Cited

U.S. PATENT DOCUMENTS 4,688,706 A * 8/1987 Thulin .................... B60R 9/058
                                                    224/320
5,104,020 A * 4/1992 Arvidsson ............... B60R 9/058
                                                    224/322

(Continued)

FOREIGN PATENT DOCUMENTS

DE    102013000460 B3    2/2014
EP        0193501 A2     9/1986
JP      2000177499 A  *  6/2000

OTHER PUBLICATIONS

International Search Report and Written Opinion of the International Searching Authority for International Application No. PCT/EP2018/085458, European Patent Office (EPO), dated Jan. 22, 2019, 11 pages.

*Primary Examiner* — Scott T McNurlen
(74) *Attorney, Agent, or Firm* — Sterne, Kessler, Goldstein & Fox P.L.L.C.

(57) ABSTRACT

Disclosed is a load carrier foot for supporting a load bar on a vehicle. The load carrier foot comprises a supporting member mountable to the load bar, a coupling member for coupling the load carrier foot to the vehicle and a tightening mechanism for tightening the coupling member. The tightening mechanism force transmittingly the couples the coupling member with the supporting member by a force distribution member. The force distribution member is configured to transfer a received input force on at least two force application sections while being translatory movably held with respect to each force application section.

15 Claims, 3 Drawing Sheets

(58) Field of Classification Search
USPC .................................................. 224/329, 331
See application file for complete search history.

(56) References Cited

U.S. PATENT DOCUMENTS 8,839,997 B2 * 9/2014 Lundgren ............... B60R 9/058
224/331
9,688,211 B2 * 6/2017 Schierk ................... B60R 9/058

* cited by examiner

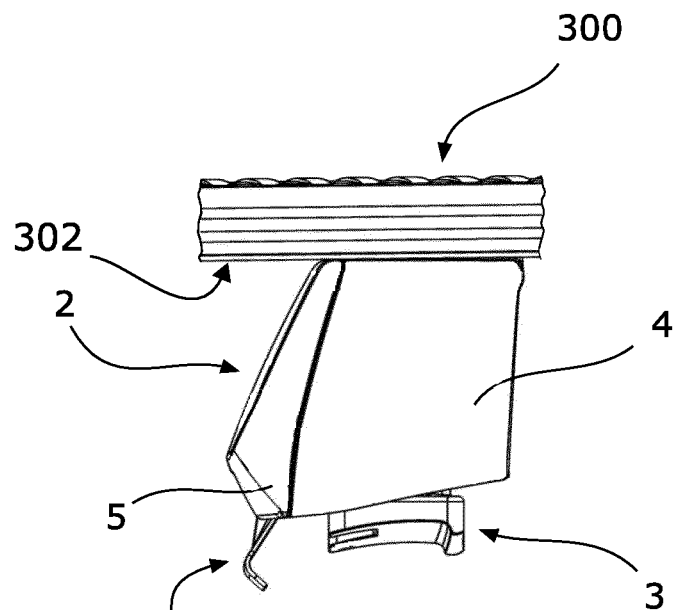
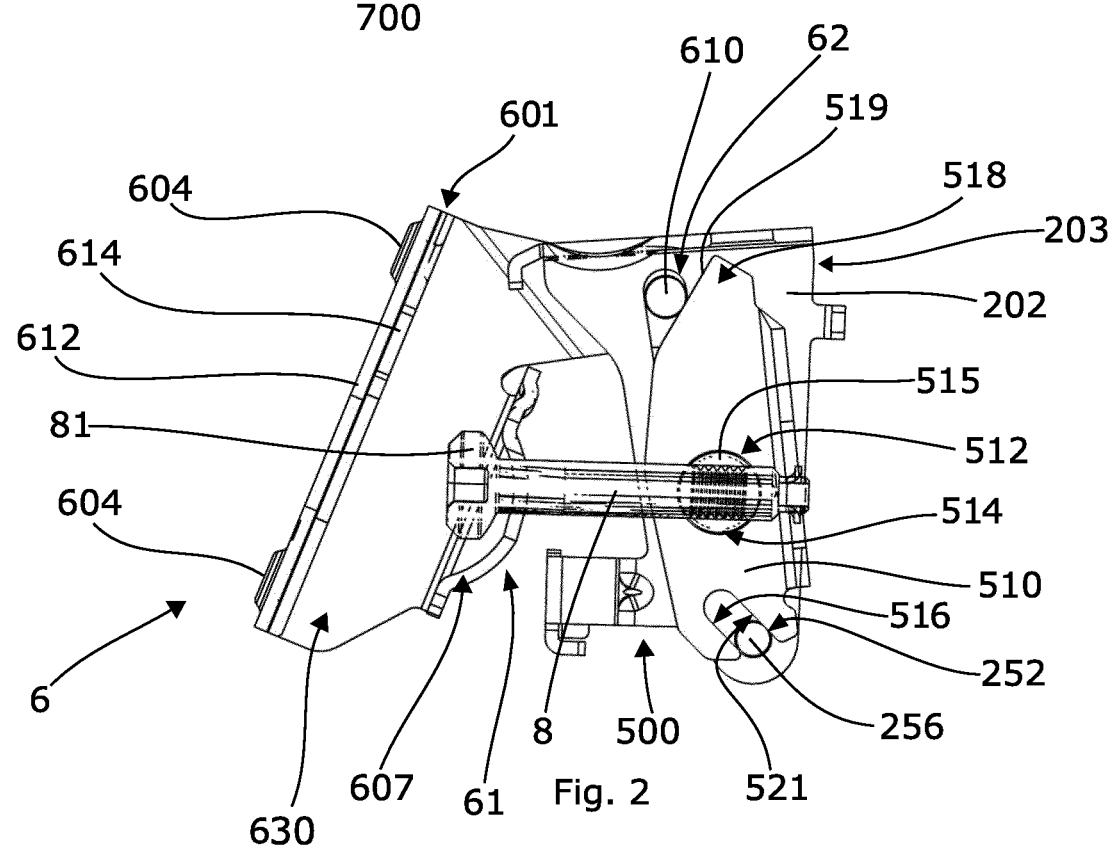

LOAD CARRIER FOOT

FIELD OF THE INVENTION

The present subject matter relates to load carrier feet for supporting a load bar on a vehicle.

BACKGROUND

Load carriers for vehicles which are mounted on the roofs of the vehicles are widely known in the art. Such load carriers typically comprise a load bar as well as load carrier feet which are coupled to the load bar and adapted to support the load bar on the vehicle roof. For mounting such load carriers, vehicles can comprise roof railings on which the load carrier feet can be fixed or the load carrier feet can be specifically designed to be mounted on roofs without roof railings.

Known load carrier systems aiming at vehicles without roof railings are supported on the vehicle roof by means of a foot pad and are fixedly clamped to the vehicle roof by means of a bracket. The bracket is configured to engage with suitable portions of the vehicle, a space between the door and the vehicle body for instance. A tightening mechanism in the load carrier foot is able to tighten the bracket so that the foot pad is pressed and securely held on the vehicle roof. However, known systems are often not able to meet higher safety requirements and standards.

SUMMARY

In view of the above background, it is the object to provide a load carrier foot which addresses the foregoing problems. In particular, it is an object to provide an enhanced load carrier foot which is able to meet higher safety requirements.

The object is solved by a load carrier foot according to independent claim 1 and/or according to the following summary. Advantageous further formations are subject of the dependent claims wherein specific further modifications can be gleaned from the following summary.

According to an aspect, a load carrier foot for supporting a load bar on a vehicle is provided. The load carrier foot comprises a supporting member, a coupling member and a tightening mechanism. The supporting member is mountable to the load bar. The coupling member is configured for coupling the load carrier foot to the vehicle. The tightening mechanism is configured for tightening the coupling member. The tightening mechanism force transmittingly couples the coupling member with the supporting member by means of a force distribution member. The force distribution member is configured to transfer a received input force on at least two force application sections while being translatory movably held with respect to each force application section.

Since the force distribution member is translatory movably held with respect to each force application section, the force distribution member is able to reorient itself in case elements of the tightening mechanism are moved due to external forces. Consequently, the load carrier foot is less susceptible to damages and a loosening of the tightening mechanism is prevented.

The coupling member can be a bracket holder or a bracket. In case the coupling member is a bracket, the bracket can be configured to be engaged with a portion of the vehicle body. In case the coupling member is a bracket holder, the bracket holder can be configured to receive the bracket. The supporting member can be any member which is directly or indirectly mountable to the load bar and configured to transfer a force on the load bar. For example, the supporting member can be an operating member of a locking mechanism for releasably locking the load bar on the load carrier foot.

The tightening mechanism is configured for tightening the coupling member using the force distribution member. For that, the tightening mechanism force transmittingly couples the coupling member with the supporting member. The tightening mechanism can couple the coupling member and the supporting member such that an operation of the tightening mechanism leads to a movement of the coupling member and the supporting member with respect to each other. The specific movement of the coupling member leads to a tightening of the load carrier foot on the vehicle roof.

The force distribution member can be configured to transfer a received input force on at least two force application sections while being translatory movably held with respect to each force application section. For example, the force distribution member can be in sliding contact with the force application sections. Therefore, substantially only normal forces are transferred from the force distribution member onto the force application sections. The force application sections can be pins, e.g. cylindrical pins.

Preferably, one force application section of the at least two force application sections is provided on the supporting member. Preferably this force application section of the at least two force application sections is provided on a portion of the supporting member which is distal with respect to load bar.

Accordingly, one force application section can be directly provided on the supporting member. It is also possible to provide two force application sections on the supporting member. One force application section can be provided distal with respect to the load bar. In other words, when a load bar is mounted on the load carrier foot, one force application section can be provided on a side of the supporting member which is remote from the load bar. This side of the supporting member can also be referred to as lower portion of the supporting member or foot pad side of the supporting member. In one configuration, a first cylindrical pin can be fixedly provided on the lower portion of the supporting member and serve as a force application section. A second cylindrical pin can be fixedly mounted on the coupling member and can be slidably guided in a guiding groove formed in the supporting member. The second cylindrical pin can serve as a further force application section.

Preferably, the force distribution member comprises a force input section for receiving the input force. The force input section can be coupled to a first coupling portion of the coupling member. At least one force application section of the at least two force application sections can be provided at a second coupling portion of the coupling member.

The force input section can be coupled to a first coupling portion of the coupling member. For example, the coupling member can be a holder for receiving a load carrier bracket for coupling the load carrier foot to the vehicle. The coupling member can also be a load carrier bracket. For example, when the coupling member is embodied as a holder, the first coupling portion can be provided on an inner wall of the holder. A tightening member can be used for coupling the force input section with the first coupling portion.

Preferably, the force input section is configured for a torque-free force transfer. Preferably, the force input section comprises a force receiving member pivotably held on the force distribution member and adapted to receive a tightening member. Preferably, the tightening member is a threaded bolt.

The force receiving member can be a cylindrical pin pivotably supported on the force distribution member. The cylindrical pin can comprise a threaded bore extending perpendicular to the longitudinal axis of the cylindrical pin. The tightening member can be threadedly engaged with the threaded bore so that a rotation of the tightening member leads to a displacement of the cylindrical pin with respect to the tightening member.

Preferably, the tightening member is pivotably coupled to the first coupling portion. Preferably, the tightening member is coupled to the first coupling portion in a spherical joint like manner. The tightening member can be a shaft nut.

The spherical joint like coupling can be provided by cooperation of a head portion of the tightening member and a supporting surface on the coupling member. The head portion comprises a contact surface which is brought in sliding contact with the coupling member.

The contact surface is curved corresponding to the supporting surface and thus allows the holder to move while the orientation of the tightening member is maintained.

Preferably, the second coupling portion is hingedly and slidably guided on the supporting member.

The second coupling portion can be a pin provided on the coupling member at an upper portion thereof, for instance.

Preferably, the supporting member comprises a guiding groove for guiding the second coupling portion. The guiding groove can be formed straight. The second coupling portion can be formed as cylindrical portion protruding into the guiding groove.

Preferably, the force distribution member is configured to distribute the input force on the force application sections such that the force application sections are urged away from each other.

Preferably, the force distribution member comprises a first contact section for contacting a first force application section of the at least two force application sections and a second contact section for contacting a second force application section of the at least two force application sections. The first contact section and the second contact section can comprise sliding surfaces.

Preferably, the force distribution member is formed in a wedge-like manner in which the sliding surfaces are formed flat and are arranged at an angle with respect to each other.

Preferably, the second contact section comprises a fork-like portion. The fork-like portion can define a U-shaped groove in which the second force application section is guided.

Preferably, the coupling member comprises a bracket for coupling the load carrier foot to the vehicle and/or a bracket holder for receiving the bracket.

Preferably, the supporting member comprises a cage-like structure configured to accommodate the force distribution member.

Preferably, the supporting member is an actuating member of a clamping mechanism for clamping a load bar on the load carrier foot so that an operation of the tightening mechanism actuates the clamping mechanism.

Using the above tightening mechanism provides a beneficial force balancing. This force balancing ensures that an angular orientation of the tightening member is substantially maintained, for example remains substantially horizontal at all times. Due to the configuration of the force distribution member, the force distribution member seeks an orientation in which the normal forces acting on the contact sections meet in a point which is located on a virtual elongated longitudinal axis of the tightening member. In other words, the force distribution member seeks an orientation in which normals to the pivot pins coincide with the virtual elongation of the tightening member in a common point.

When the load carrier comprising such load carrier foot is moved due to external forces, the coupling member can also move slightly. This movement tends to change the angular orientation of the tightening member. However, due to the construction of the tightening mechanism, the force distribution member compensates that by adjusting itself such that a force equilibrium or balance is achieved. Due to this force balancing, the overall load carrier has a better performance in collision tests as no loss in clamping force occurs due to a movement of the coupling member.

BRIEF DESCRIPTION OF THE DRAWINGS

FIG. 1 shows a side view of a load carrier assembly.

FIG. 2 shows a cross-sectional view of an assembly of components of the load carrier foot.

DETAILED DESCRIPTION OF EMBODIMENTS

Figure 3:
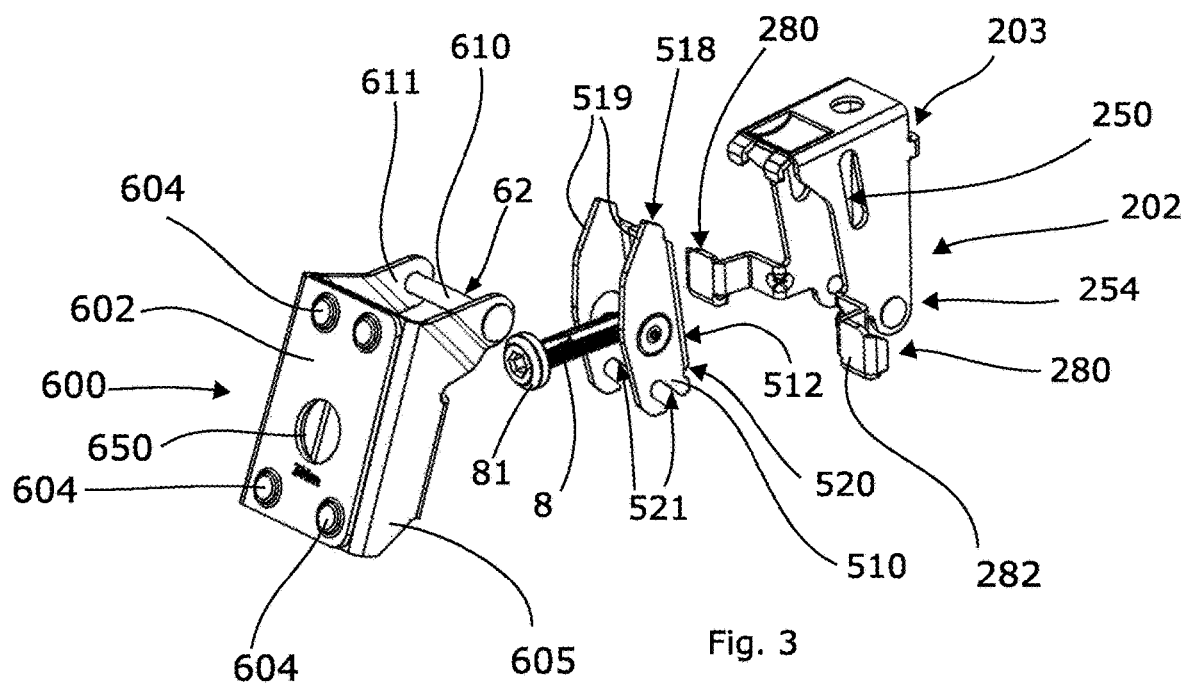
FIG. 3 shows a perspective exploded view of the assembly shown in FIG. 2.

In the following, an embodiment as well as modifications of the present subject matter will be described with reference to the drawings. It is to be noted that similar elements in the drawings are denoted with the same reference signs.

FIG. 1 shows a side view of an assembly comprising a load carrier foot 2 according to an embodiment. A load bar 300 is supported on an upper portion of the load carrier foot 2. More precisely, an outer surface 302 of the load bar 300 is supported on the upper portion 203 of the load carrier foot 2. Furthermore, a load carrier bracket 700 is inserted into and fixedly held in the load carrier foot 2. The load carrier foot 2 further comprises a foot pad 3.

The foot pad 3 is configured to be supported on the roof of a vehicle. As is further shown in FIG. 1, the load carrier foot 2 comprises a front cover 5 and a rear cover 4 which cover an interior mechanism of the load carrier foot 2. An assembly of components of the load carrier foot 2 is shown in FIG. 2 in cross section and in FIGS. 3 and 4 in perspective exploded view.

The assembly comprises a holder 6, a supporting member 202 and a tightening mechanism 500 coupling the holder 6 and the supporting member 202.

Figure 4:
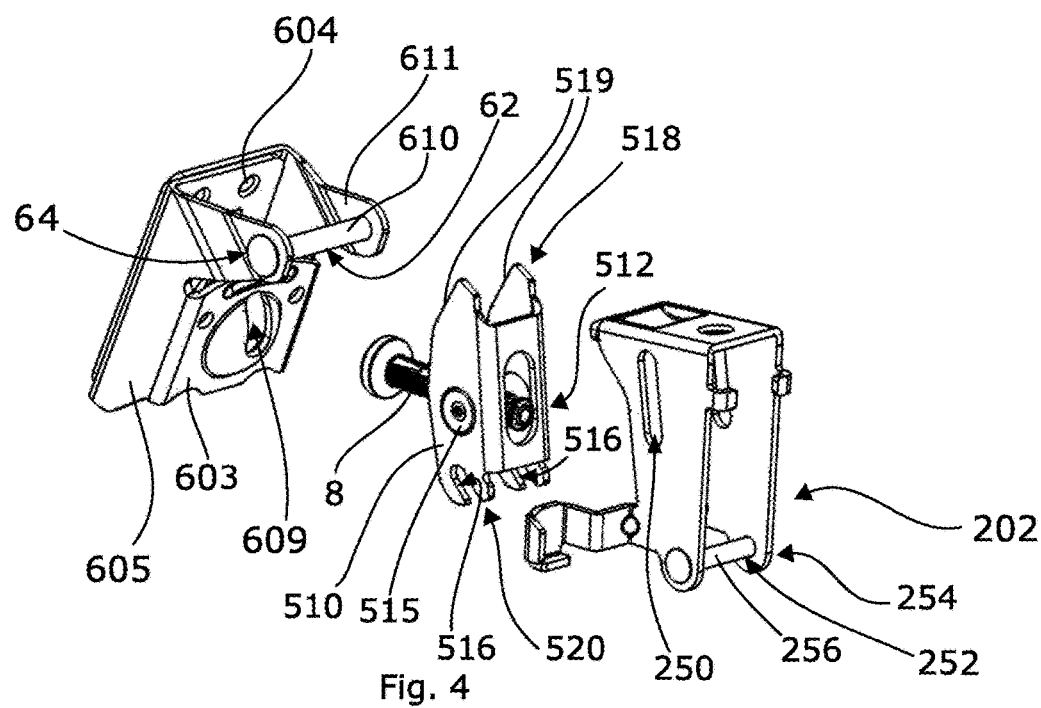
FIG. 4 shows a further perspective exploded view of the assembly shown in FIG. 2.
Figure 5:
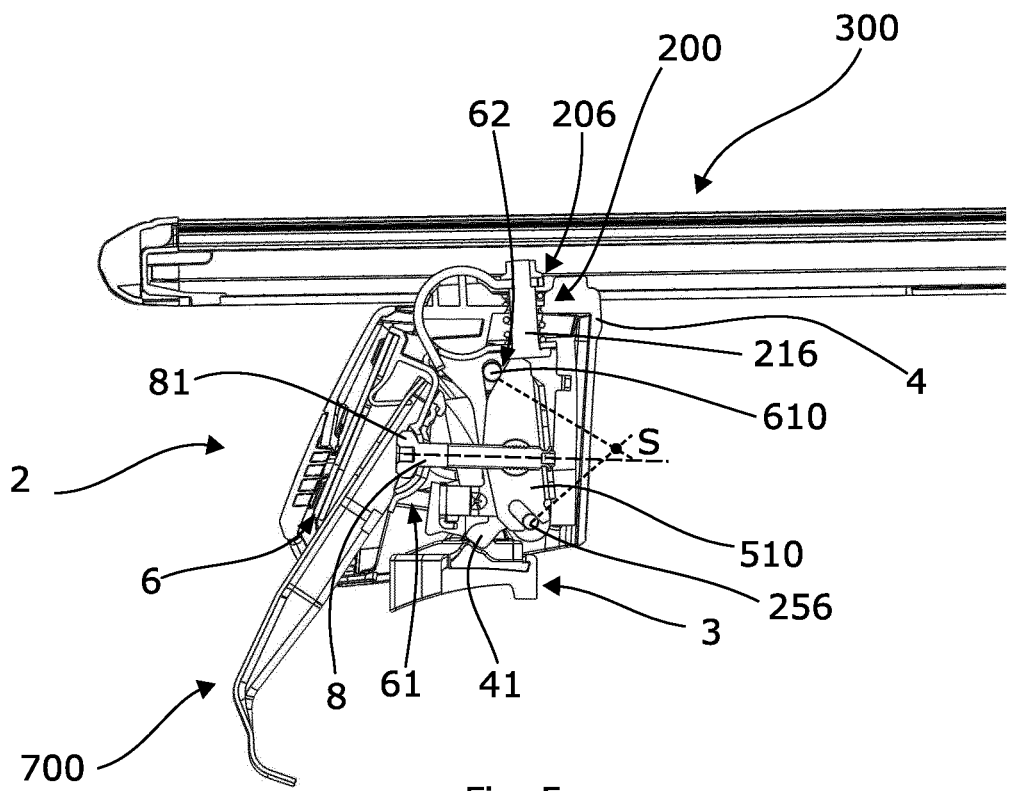
FIG. 5 shows a cross-sectional view of the load carrier assembly of FIG. 1.

An example of a configuration of the holder 6 can be gathered from FIGS. 2 to 4. The holder 6 comprises a sleeve portion 600 which is formed in a lower portion of the holder 6. The sleeve portion 600 comprises a box-like shape and comprises an outer wall 602, an inner wall 603 and two side walls 605 connecting the inner wall 603 with the outer wall 602. The holder 6 is integrally formed by bending a metal sheet. The outer wall 602 is defined by an overlap section 601 which is formed by two joining sections 612, 614 of the metal sheet. The joining sections 612, 614 are arranged parallel and in contact with each other. More precisely, the joining sections 612, 614 are joined with each other by press-forming them together. In the present case, the joining sections 612, 614 are clinched together at four joining portions 604. Accordingly, the outer wall 602 is reinforced by using two layers of sheet metal that are joined to each other. The sleeve portion 600 has a completely closed shape encasing an accommodating space 630 in which the load carrier bracket 700 can be at least partially accommodated as is shown in the configuration of FIG. 5. The outer wall 602 comprises an access opening 650 providing access to the accommodating space 630 from a front side of the load carrier foot 2. This access opening 650 is designed such that a tool for operating a tightening member 8 of the tightening mechanism 500 can be inserted into the accommodating space 630. The coupling portion 61 comprises an accommodating recess 607 which is formed in the inner wall 603. The accommodating recess 607 comprises a supporting surface which is formed in a spherical manner. An opening 609 is provided in the supporting surface 608 allowing to pass a portion of the tightening member through the inner wall 603. Here, the opening is an elongate opening extending along the longitudinal direction of the sleeve portion 600. The elongate opening can have an extension length allowing to insert the tightening member via a lower opening of the sleeve portion. In this case, it is possible to provide an access opening 650 which is smaller than an access opening through which the tightening member 8 is to be inserted. This enhances the rigidity of the sleeve portion 600. The holder 6 comprises an upper portion which comprises two arms 611 each having an opening for accommodating the pivot pin 610 therein. The pivot pin 610 is defines a pivot axis.

In the present configuration, the holder 6 is pivotably coupled to the supporting member 202. For that, the holder 6 comprises a coupling portion 64 comprising a pivot pin 610 which is slidably held in a guiding groove 250 of the supporting member 202. The guiding groove 250 is formed substantially straight, substantially in longitudinal direction of the supporting member 202 and in the upper half or upper portion 203 of the supporting member 202. The guiding groove 250 can also be formed curved. Accordingly, the pivot pin 610 is guided such that it can be moved towards and away from an upper end of the supporting member 202. The pivot pin 610 also defines a force application section 62 for receiving a force from the force distribution member 510 as will be described later.

On the upper end or upper portion 203 of the supporting member 202, further elements of a locking mechanism 200 for releasably locking the load bar 300 to the load carrier foot 2 can be fixed as shown in FIG. 5. The upper end can also be referred to as load bar side end of the supporting member 202 as it is close to the load bar when the same is mounted on the load carrier foot 2. The lower end or lower portion 254 of the supporting member 202 can also be referred to as foot pad side end of the supporting member 202 as it is arranged closer to the foot pad 3. A pivot pin 256 is provided in the lower portion 254. In the assembly, the pivot pin 256 is arranged parallel with the pivot pin 610 of the holder 6 and fixed on the supporting member 202 non-movably with respect to the same. The pivot pin 256 defines another force application section 252 for receiving a force from the force distribution member 510.

The tightening mechanism 500 comprises a force distribution member 510. The force distribution member 510 can be described as a wedge-like member having contact surfaces arranged at an angle with respect to each other. As is shown in FIG. 2, the force distribution member comprises a first contact section 518 comprising a first contact surface 519. The force distribution member 510 can comprise two first contact surfaces 519 arranged at a distance from each other as can be gathered from FIGS. 3 and 4. The first contact surface or contact surfaces 519 are in sliding contact with the pivot pin 610 of the holder 6.

The force distribution member 510 further comprises a second contact section 520 comprising a second contact surface 521. The second contact section 520 can comprise two contact sections 520 as is shown in FIGS. 3 and 4. The second contact surfaces 521 are in sliding contact with the pivot pin 256 of the supporting member 202. As is shown in the drawings, the second contact section 520 is formed in a fork-like manner. In other words, a U-shaped groove with two parallel side walls is provided wherein one of the side walls defines the second contact surface 521 and another side wall 516 defining an opposing contact surface. In this way, the force distribution member 510 is prevented from coming off the pivot pin 256 in an untightened state of the tightening mechanism 500. The opposing contact surfaces 521, 519 allow and/or control a pivoting motion of the force distribution member 510 about the pivot pin 256.

The force distribution member 510 further comprises a force input section 512. A force receiving member 514 which is embodied as a pivot pin 515 is provided in the force input section 512 and is arranged in parallel with the pivot pin 256 and is pivotally held on the force distribution member 510. The pivot pin 515 comprises a threaded bore.

The tightening mechanism 500 comprises a tightening member 8. The tightening member 8 is a tightening screw having a head portion or operating portion 81 and a threaded portion which is threadedly engaged with the threaded bore of the pivot pin 515. The head portion 81 is supported on a first coupling portion 61 of the holder 6, more precisely on an inner wall 603 of the holder 6.

A shaft of the tightening member 8 is passed through an opening formed in the inner wall 603 of the holder 6. Furthermore, a contact surface on the inner wall 603 and a supporting surface on the head portion 81 contacting the contact section on the inner wall 603 are formed with a similar curvature and are both spherical. Thus, the tightening member 8 is supported on the first coupling portion 61 in a spherical joint like manner. The opening in the inner wall 603 is formed such that the tightening member 8 can substantially maintain its angle with respect to the holder 6 even when the holder is moved.

The first contact surface 519 and the second contact surface 521 are arranged at an angle with respect to each other. Furthermore, both contact surfaces 519, 521 are substantially flat surfaces in the embodiment. However, the contact surfaces can be curved as well.

The first contact surface 519 is in sliding contact with the pivot pin 610. The second contact surface 521 is in contact with the pivot pin 256. Thus, when the force distribution member 510 is moved towards the holder 6 by operating the tightening member 8, that is towards the left side in FIG. 2 or in FIG. 5, an input force as introduced into the force distribution member 510 is distributed on the pivot pin 610 and the pivot pin 256. Accordingly, the pivot pin 610 forms the above mentioned second force application section 62 of the holder 6. Due to the provision of the above described contact surfaces 519, 521, the pivot pins 610 and 256 are urged away from each other while the supporting member 202 and the holder 6 are rotated towards each other. In other words, the upper pivot pin 610 is pushed upwards. This leads to an upward movement of the holder 6.

Since forces are transferred via the contact surfaces 519, 521 and the contact surfaces 519, 521 are allowed to translatory and slidingly move with respect to the pivot pins 610, 256, it is ensured that the normal forces acting on the contact surfaces 519, 521 maintain an equilibrium. Imaginary lines reflecting the direction the normal forces act on the contact surfaces intersect at a point S as is shown in FIG. 5. The equilibrium is reached when the point S intersects with an imaginary elongated middle axis of the tightening member 8. In other words, the force equilibrium is reached when both contact normals on the contact surfaces 519, 521 and a virtual extension or axis of the tightening member 8 coincide in the same point S. Due to the described construction, the force distribution member 510 automatically seeks an orientation in which the above equilibrium condition is fulfilled.

Thus, when the overall system is influenced by strong external forces such as during a collision and the components of the system are displaced with respect to each other, the force distribution member 510 reorients itself in order to reestablish the force equilibrium. In this way, a new force equilibrium can be instantly obtained due to a corresponding movement of the force distribution member 510. Due to this configuration and arrangement of the force distribution member 510, it is prevented that tension can build up within the system, which could cause the system to collapse or break when strong forces are acting.

As can be gathered from FIGS. 2, 3 and 4, the force distribution member 510 and the supporting member 202 are configured such that the force distribution member 510 is accommodated in the supporting member 202. For that, the supporting member 202 comprises a cage like structure having two legs extending from the upper portion 203 of the supporting member 202 towards the lower portion 254. In the upper portion 203, the legs are coupled by a wall defining a flat outer surface and extend from the wall substantially parallel with respect to each other.

As illustrated in FIG. 5, the supporting member 202 can be an operating member of a locking mechanism 200 for releasably locking the load bar 300 on the load carrier foot 2. The operating member can comprise two operating portions 280 each having a push surface 282 being configured for thumb operation by a user. The locking mechanism comprises an engaging section 206 adapted to engage with the load bar 300 and coupled to the supporting member 202 by means of a bolt 216 which acts as a force transfer member for transferring a force from the supporting member 202 on the engaging section 206. Accordingly, the load carrier foot 2 can be configured such that the tightening mechanism 500 additionally operates the locking mechanism 200.

Figure 6:
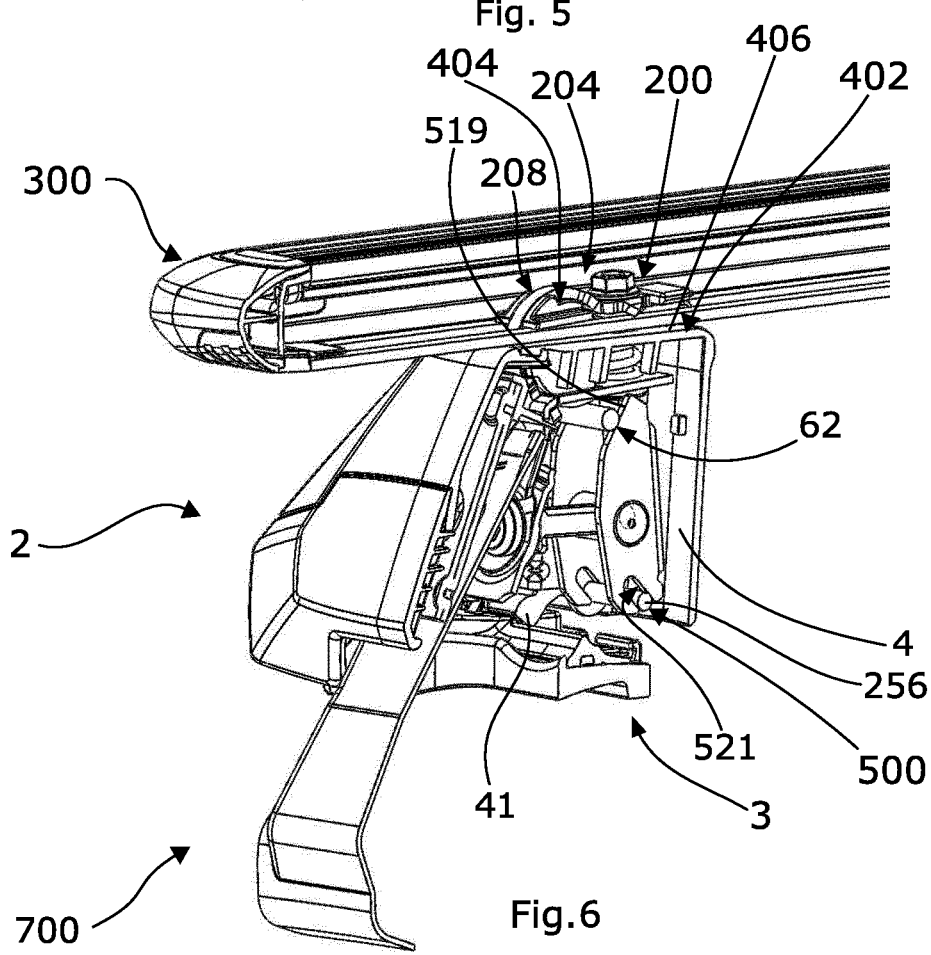
FIG. 6 shows a perspective cross-sectional view of the load carrier assembly of FIG. 5.

FIG. 6 shows a perspective view sectional view of the load carrier shown in FIG. 5. The load carrier comprises a load bar 300, a load carrier foot 2 supporting the load bar 300 and the load carrier bracket 700. The load carrier foot 2 comprises the locking mechanism 200 for locking the load bar 300 on the load carrier foot 2, more precisely for clamping the load bar 300 on a supporting portion 402 of the load carrier foot 2, which is a portion of the rear cover 4. In the disclosed configuration, the supporting portion 402 is an integral part of the rear cover 4 of the load carrier foot 2. The rear cover 4 can also be referred to as support member 400 for supporting the load bar thereon. The supporting portion 402 comprises a supporting surface 406 formed in the rear cover 4. Accordingly, the rear cover 4 acts as a support for supporting the load bar 300. In other words, the load bar 300 is supported on an upper portion of the rear cover 4. The rear cover 4 is supported on the foot pad 3. More precisely, the rear cover 4 comprises a coupling portion 41 which is engaged with the foot pad 3. This coupling portion is shown in FIGS. 12 and 14. The foot pad 3 is adapted to contact the vehicle roof and for transferring a load onto the vehicle roof. The rear cover, can be movably, e.g. rotatably, supported on the foot pad. More precisely, a lower portion of the rear cover can be specifically designed to be supported on an upper side of the foot pad 3. Thus, the rear cover 4 is able to transfer a load received from a load bar 300 onto the foot pad 3. In this way, a major part of a normal force applied on the load carrier foot 2 by the load bar 300 is directly transferred to the foot pad 3 by means of the rear cover. The configuration is such that the foot pad 3 only receives forces from the rear cover. The support member 400 further comprises a pivot portion 404. The pivot portion 404 comprises a cylindrical supporting surface for pivotably supporting a supporting section 208 of a locking member 204 of the locking mechanism. The pivot portion 404 is integrally formed with the other elements of the rear cover 4.

The invention claimed is:

1. A load carrier foot for supporting a load bar on a vehicle, said load carrier foot comprising:
   a supporting member mountable to said load bar;
   a coupling member for coupling said load carrier foot to said vehicle; and
   a tightening mechanism for tightening said coupling member,
   wherein a tightening mechanism force transmittingly couples said coupling member with said supporting member, wherein said tightening mechanism force transmittingly couples said coupling member with said supporting member by a force distribution member which is configured to transfer a received input force on at least two force application sections while being translatory movably held with respect to each force application section.

2. The load carrier foot according to claim 1, wherein one force application section of said at least two force application sections is provided on said supporting member on a portion of said supporting member which is distal with respect to said load bar.

3. The load carrier foot according to claim 1, wherein said force distribution member comprises a force input section for receiving said input force, said force input section being coupled to a first coupling portion of said coupling member, and wherein at least one force application section of said at least two force application sections is provided at a second coupling portion of said coupling member.

4. The load carrier foot according to claim 3, wherein said force input section is configured for a torque-free force transfer and comprises a force receiving member pivotably held on said force distribution member and adapted to receive a tightening member, wherein said tightening member is a threaded bolt.

5. The load carrier foot according to claim 4, wherein said tightening member is pivotably coupled to said first coupling portion with a spherical joint.

6. The load carrier foot according to claim 3, wherein said force input section is arranged between said force application sections.

7. The load carrier foot according to claim 3, wherein said second coupling portion is hingedly and slidably guided on said supporting member.

8. The load carrier foot according to claim 7, wherein said supporting member comprises a guiding groove for guiding said second coupling portion, wherein said guiding groove is formed straight and wherein said second coupling portion is formed as a cylindrical portion protruding into said guiding groove.

9. The load carrier foot according to claim 1, wherein said force distribution member is configured to distribute said input force on said force application sections such that said force application sections are urged away from each other.

10. The load carrier foot according to claim 1, wherein said force distribution member comprises a first contact section for contacting a first force application section of said at least two force application sections and a second contact section for contacting a second force application section of said at least two force application sections, wherein said first contact section and said second contact section comprise sliding surfaces.

11. The load carrier foot according to claim 10, wherein said force distribution member is formed as a wedge in which said sliding surfaces are formed flat and are arranged at an angle with respect to each other.

12. The load carrier foot according to claim 10, wherein said second contact section comprises a fork portion defining a U-shaped groove in which said second force application section is guided.

13. The load carrier foot according to claim 1, wherein said coupling member comprises a bracket for coupling said load carrier foot to said vehicle or a bracket holder for receiving said bracket.

14. The load carrier foot according to claim 1, wherein said supporting member comprises a cage structure configured to accommodate said force distribution member.

15. The load carrier foot according to claim 1, wherein said supporting member is an actuating member of a clamping mechanism for clamping a load bar on said load carrier foot so that an operation of said tightening mechanism actuates said clamping mechanism.

* * * * *